US006332941B1

(12) United States Patent
Council et al.

(10) Patent No.: US 6,332,941 B1
(45) Date of Patent: Dec. 25, 2001

(54) MODULAR FLOOR TILE WITH SUPERIMPOSED IMAGES

(75) Inventors: Walter S. Council, Raleigh; Carl W. Regutti, Cary; H. Leigh Ballance, Jr., Raleigh, all of NC (US)

(73) Assignee: Invincible Products, Inc.

( * ) Notice: Subject to any disclaimer, the term of this patent is extended or adjusted under 35 U.S.C. 154(b) by 0 days.

(21) Appl. No.: 09/412,029

(22) Filed: Oct. 4, 1999

(51) Int. Cl.[7] .............................. B44C 1/17; B32B 31/20; B32B 3/16; B41F 19/00; B41F 16/00

(52) U.S. Cl. .......................... 156/230; 156/240; 156/247; 156/277; 156/289; 427/146; 427/148; 427/280; 428/195; 428/914; 428/49; 101/487; 101/491; 101/492

(58) Field of Search .................................... 156/230, 238, 156/240, 241, 247, 277, 289; 427/146, 147, 148; 428/195, 914, 280, 49; 8/467, 468, 470, 471; 101/487, 491, 492

(56) References Cited

U.S. PATENT DOCUMENTS 4,172,418 * 10/1979 Durand ................................ 101/194
4,174,250 * 11/1979 Durand ............................. 156/583.3
4,462,853 7/1984 Ringer ................................. 156/238
4,678,528 7/1987 Smith et al. ......................... 156/220
4,792,376 12/1988 Denley ................................ 156/540
5,246,518 9/1993 Hale .................................... 156/230
5,693,395 12/1997 Wine ..................................... 428/49
5,916,843 * 6/1999 Weller ................................. 503/227
6,025,023 * 2/2000 Valente et al. ....................... 427/256

* cited by examiner

*Primary Examiner*—Richard Crispino
*Assistant Examiner*—J. A. Lorengo
(74) *Attorney, Agent, or Firm*—Coats & Bennett, P.L.L.C.

(57) ABSTRACT

Images are impressed on the surface of plastic tiles by a sublimation process. A tile having top and bottom surfaces is placed in a heating press having top and bottom platens. A transfer medium with a printed image thereon is placed in contact with the top surface of the tile. The tile is heated to a temperature sufficient to sublimate the dye and transfer the image onto the top surface of the tile. Heat is applied from both the top and bottom of the tile to prevent warping of the tile. The heat applied to the bottom of the tile is preferably slightly greater than the heat applied to the top of the tile.

6 Claims, 9 Drawing Sheets

MODULAR FLOOR TILE WITH SUPERIMPOSED IMAGES

FIELD OF THE INVENTION

This invention relates generally to modular floors systems, and more particularly, to a molded plastic tile having superimposed images on an upper surface of the tile.

BACKGROUND OF THE INVENTION

Modular thermoplastic floor tiles have been developed as a low cost substitute for conventional flooring surfaces, such as hardwood floors. In general, modular thermoplastic floor systems are less expensive to install and maintain than most conventional surfaces. Additionally, modular thermoplastic tiles have many beneficial properties that make them particularly suitable for athletic playing surfaces. For example, thermoplastic floor files have good impact absorption properties that reduce the risk of injury to players. For these reasons, modular thermoplastic floor systems are steadily gaining popularity. Examples of modular floor tiles are disclosed in the patents to Kotler, U.S. Pat. Nos. 4,930,286 and 4,860,510; Menconi et al., U.S. Pat. No. 4,436,779; and Forlenza, U.S. Pat. No. 4,054,987.

While modular thermoplastic tiles make an excellent playing surface for athletics, they have not yet gained acceptance as a flooring surface in residential or commercial construction despite their many beneficial qualities. One problem is that such tiles typically come in only a limited number of designs and patterns. Typically, tiles come in either a solid color, or may have a marbled or granite appearance. Another problem is that the top surface of the floor tile becomes scuffed, thus detracting from the appearance of the tile. Also decorative designs put onto the surface of such tiles are typically just surface applications of paints, inks and plastisols or laminates. In high wear areas, such as basketball courts, these designs tend to scratch and erode off or delaminate at the edges. For these reasons, the use of molded tiles has been limited to athletic playing surfaces and other applications where appearance is not a primary concern.

SUMMARY OF THE INVENTION

The present invention is a modular floor tile that can be made with an infinite variety of designs and patterns. For example, the plastic tile may be made with the appearance of wood grain, marble, stone or any other conventional flooring surfaces. Additionally, virtually any two-dimensional graphical image can be superimposed on and into the surface of the tile. Examples of graphical images include photographs, wallpaper patterns, paintings, cartoon images, portraits, and company logos. The patterns may repeat on every tile or may cover large arrays of tiles. The tiles may be used as floor, wall, or ceiling tiles. The tiles can be used in gymnasiums, office and commercial facilities, and in homes. Because the invention creates a modular plastic tiles with deep color penetration, their decorative designs can be guaranteed to withstand long term wear and abrasive or erosive environments.

The tile is constructed in two pieces—a top member and a bottom member. The top member is made of a relatively hard material that is resistant to scuffing and that readily accepts sublimation dyes to form images on the surface thereof. The bottom member is made of an impact-absorbing material such as SBR. The top member and bottom member are formed separately by injection molding and then subsequently joined by any suitable means. The method of joining the top member and bottom member is not a material aspect of the invention.

In a preferred embodiment of the invention, the top member includes a plurality of male and female connectors for interlocking the tiles with one another. The male connectors project outwardly from two sides of the top member. Corresponding female connectors are formed in the other two sides of the top member. The male connectors on one tile engage with the female connectors of an adjacent tile to interlock the tiles with one another.

Also, in a preferred embodiment of the invention, the support member has a generally flat bottom surface and a plurality of spaced-apart support nodes extending downward from the bottom surface. The support nodes maintain the bottom surface of the support member in an elevated position relative to the underlying support surface to define an air circulation space between the bottom surface and the underlying support surface. Air can freely circulate between the support nodes within the air circulation space.

Preferably, images are superimposed on the upper surface of the top member after the top member is formed but before the top member is attached to the bottom member. The image is preferably formed by sublimation. In general, this process entails transferring an image printed on transfer paper onto the surface of the tile. The complement of the desired image is printed on a transfer paper using a class of dyes known as sublimation dyes. The transfer paper is placed face down onto the surface of the tile. Heat and pressure is applied to sublimate the dye on the transfer paper. When sublimation occurs, the dyes penetrate the pores and polymer matrix of the tile to transfer the image onto the tile. A key feature of the process is to control the heat and pressure applied to the top member during the sublimation process. Since sublimation requires very high temperatures, the top member will tend to warp when subjected to the high temperatures needed to sublimate the dye. The application of heat and pressure to the tile is carefully controlled to minimize warping of the tile during the sublimation process. Specially designed platens are used to uniformly heat the top member on both sides. Similarly formed platens are used to press the tiles while the tiles cool.

The present invention may also have other advantageous properties that will be apparent to those of ordinary skill in the art from the foregoing description.

DETAILED DESCRIPTION OF THE INVENTION

Figure 1:
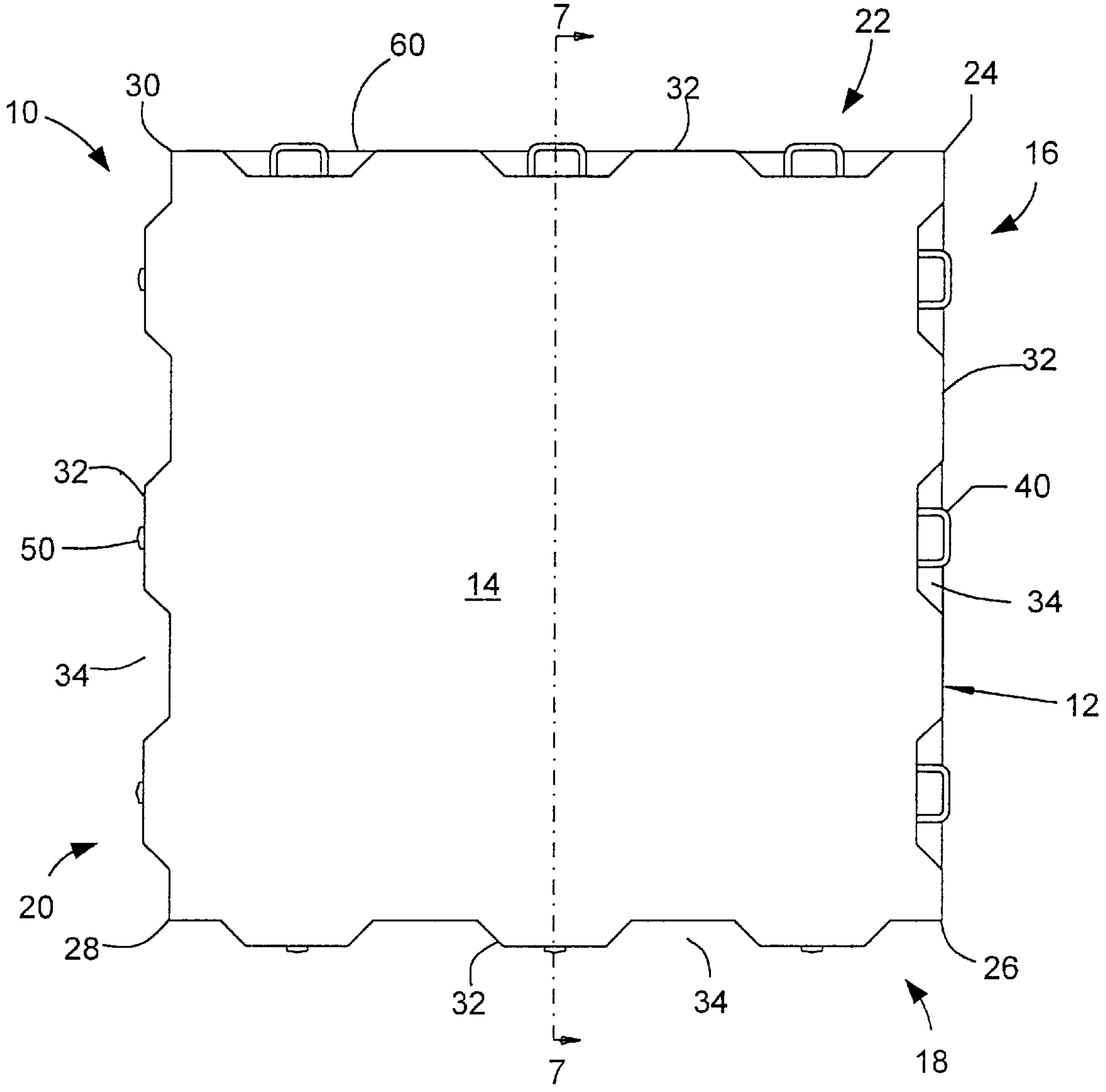
FIG. 1 is a top plan view of the modular floor tile of the present-invention.

Referring now to the drawings, the modular file of the present invention is shown therein and indicated generally by the numeral 10. Each module or tile 10 comprises two pieces—a top member 12 and a support member 60. The top member 12 is injection molded from a synthetic material such as PVC, polyester, nylon, polycarbonate, polypropylene, other thermoplastic material, or a combination thereof. For example, one suitable material is called LUMAX FL 5003, which is made by LG Chemical Ltd. in Seoul, Korea. The support member 60 is injection molded from a rubber (e.g. urethane rubber), polyolefin plastics, PVC, other thermoplastics, or a combination thereof. The top member 12 and support member 60 are molded separately and then bonded to form a unitary construction. Each tile 10 has a generally square configuration and is designed to join with other like files 10 to form a continuous, uninterrupted playing surface.

Figure 2:
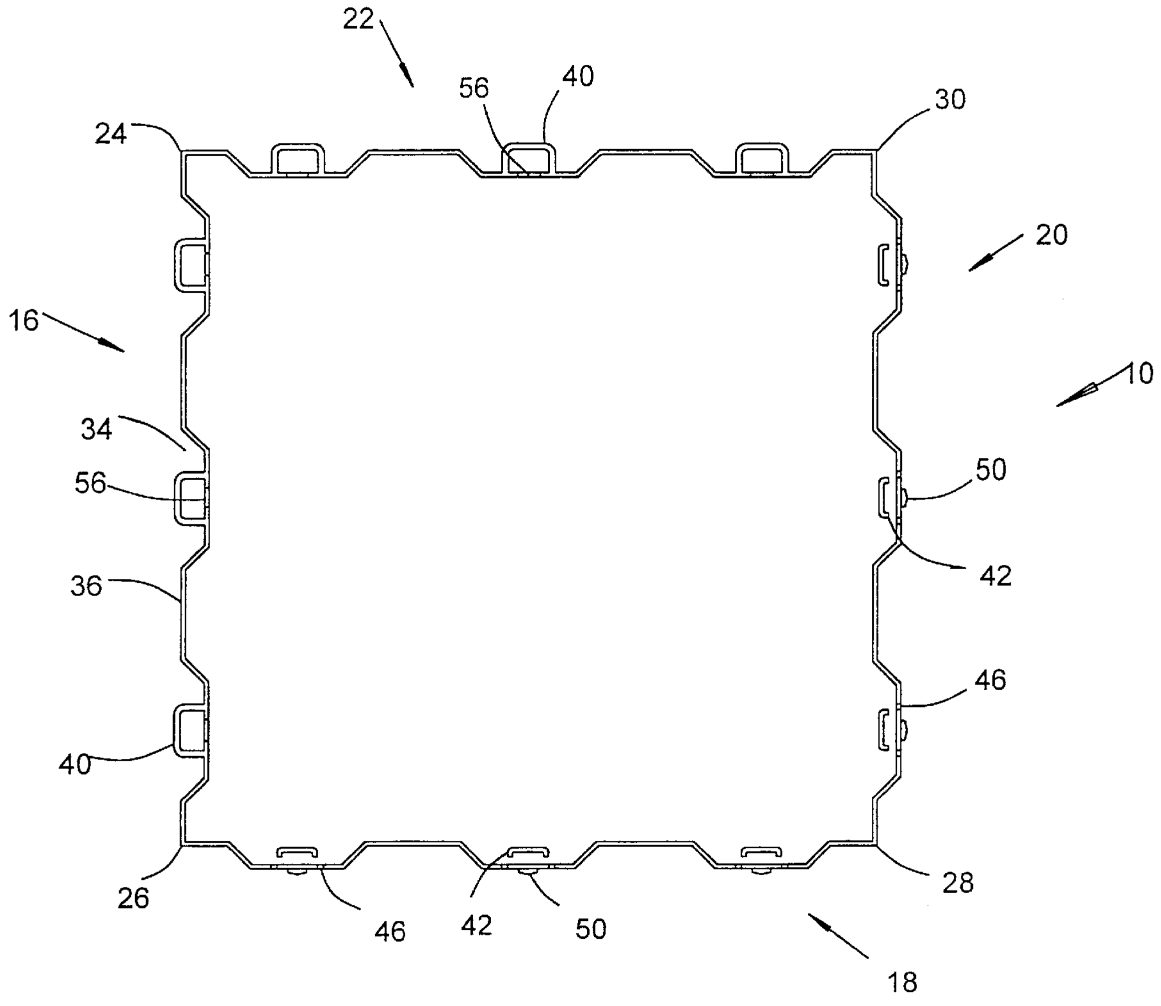
FIG. 2 is a bottom plan view of the modular floor tile without the support member.

Referring now to FIGS. 1 and 2, the top member 12 is shown. The top member 12 includes a top surface 14 and four sidewalls 16,18,20 and 22, which meet at corners 24, 26, 28 and 30. Each sidewall 16, 18, 20, 22 includes a series of alternating projections 32 and recesses 34. The projections 32 on sidewalls 18, 20 extend outward from the square defined by the four corners of the tile 10. On the remaining two sidewalls 16, 22, the recesses 34 extend inward from the side of the square defined by the four corners of the tile 10. It will be readily apparent therefore that the configuration of the sidewalls 18, 20 complements the configuration of the sidewalls 16, 22 so that the projections 32 on sidewalls 16, 22 mate with the recesses 34 on sidewalls 18,20, and vice versa.

Figure 3:
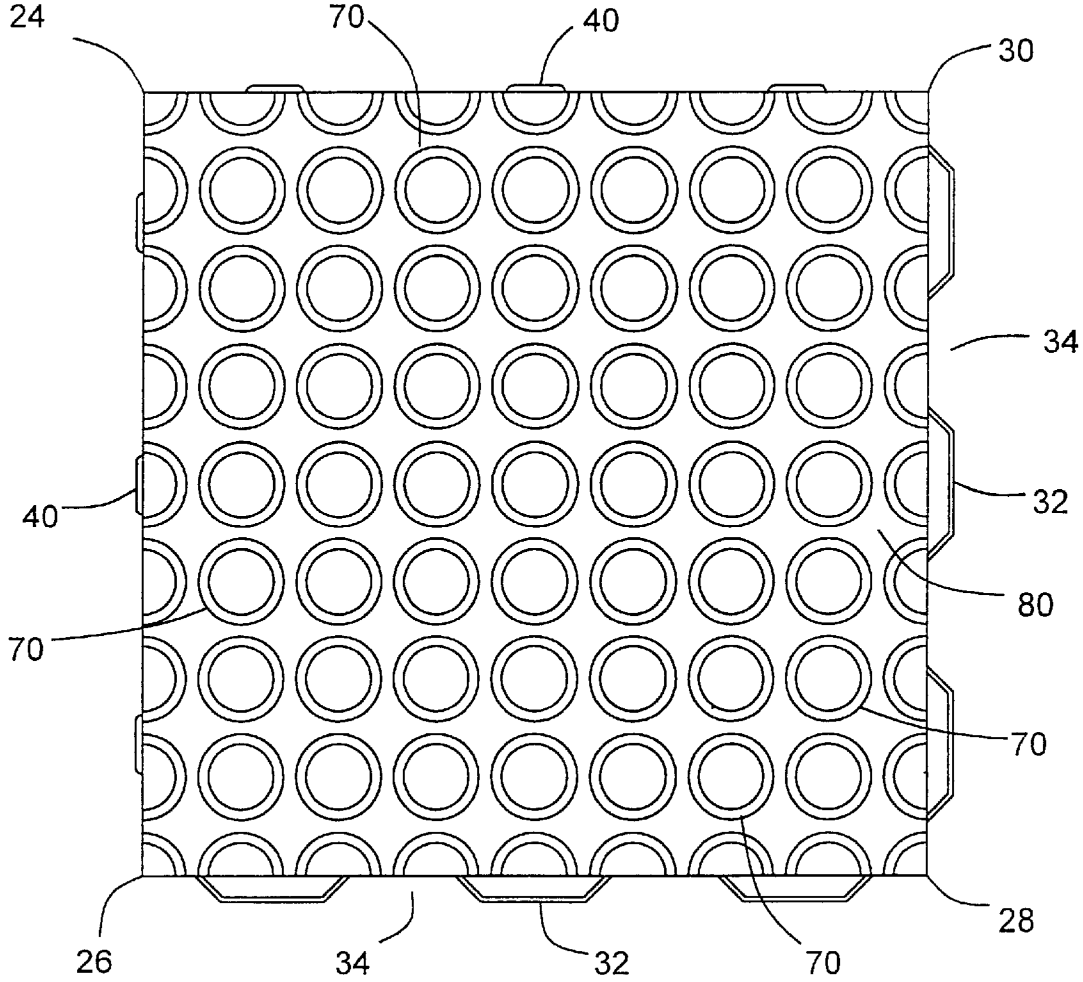
FIG. 3 is a bottom plan view of the modular floor tile with the support member.
Figure 4:
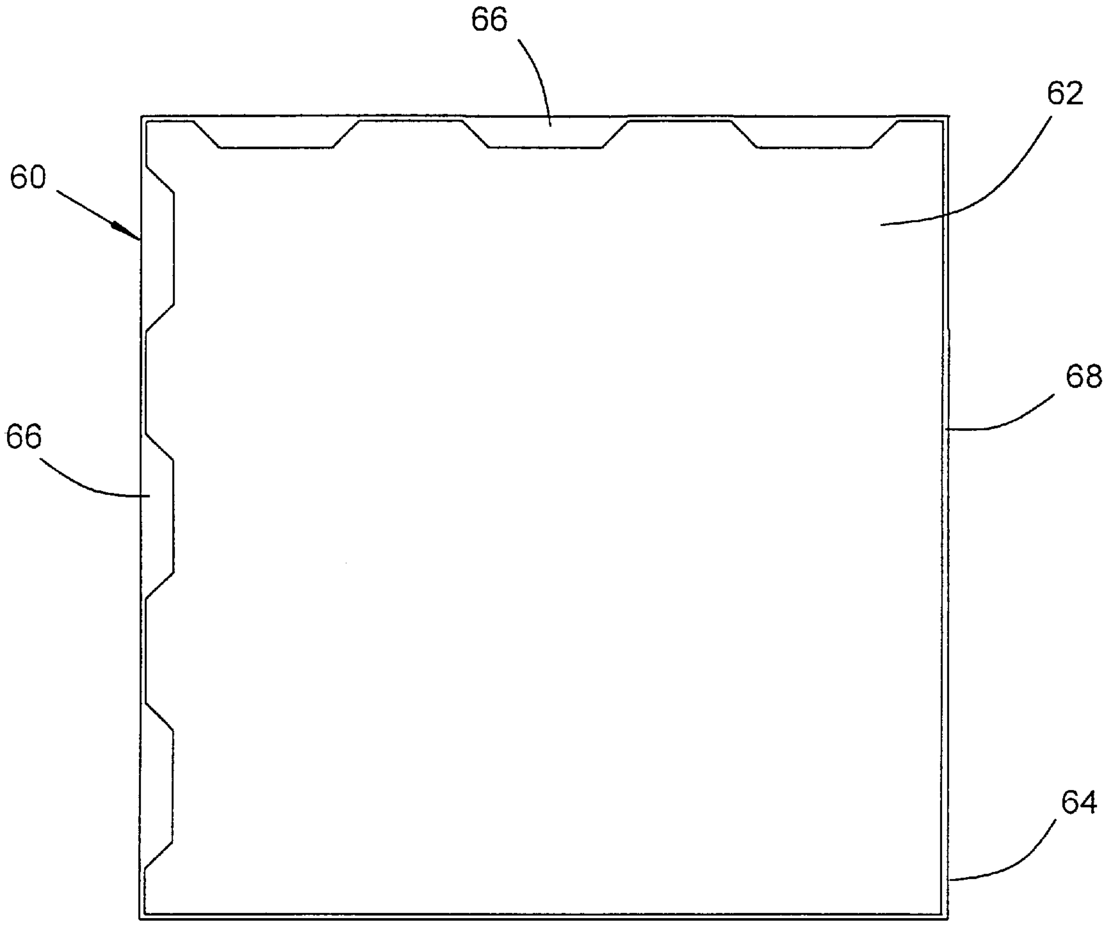
FIG. 4 is a top plan view of the bottom member.
Figure 5:
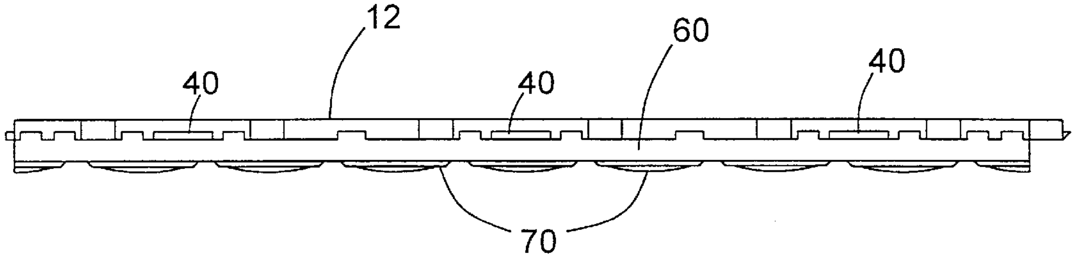
FIG. 5 is an elevation view of the floor tile.
Figure 6:
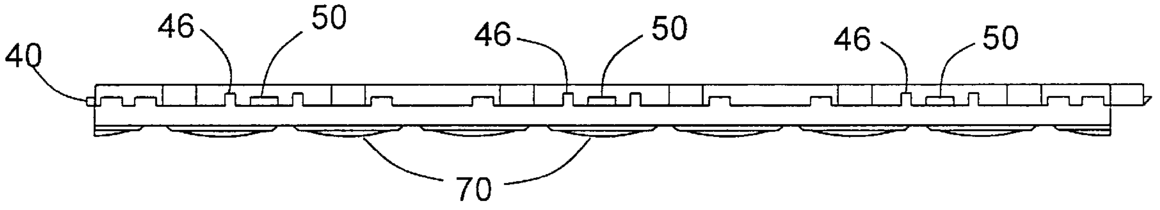
FIG. 6 is an another elevation view of the floor tile.
Figure 7:
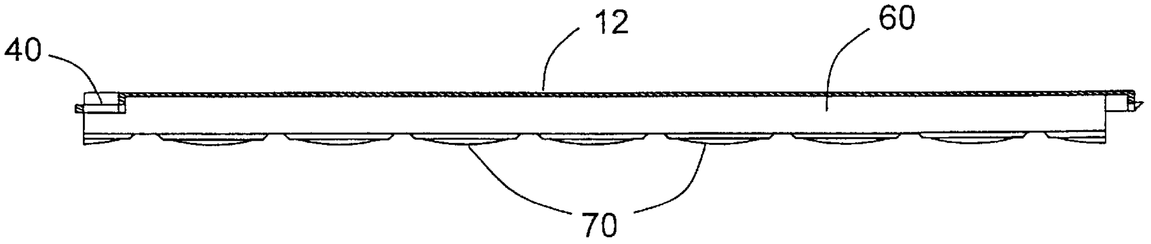
FIG. 7 is a section view taken along line 7—7 of FIG. 1.

FIGS. 3 and 4 show the support member 60. The support member 60 is a single sheet formed preferably by an injection molding process. The support member 60 is approximately twice the thickness of the top member 12. The support member 60 includes a top portion 62 and a bottom portion 64. The bottom portion is slightly larger than the top portion 62 so as to define a small ledge 68 that surrounds the top portion 62. The top portion 62 is sized and shaped to fit snugly into the top member 12 and includes a series of recesses 66, which correspond in form and position to the recesses 34 on sides 16,22 of the top member 12. When the top portion 62 of the support member 60 is inserted into the top member 12, the bottom portion 64 of the support member 60 extends below the bottom edge of the sidewalls of the top member 12 as seen in FIGS. 5–7. The sidewalls of the top member 12 seat against the ledge 68 that surrounds the top portion 62 of the support member 60. Thus, the bottom portion 64 of the support member 60 extends beneath the sidewalls of the top member 12. Preferably, the bottom portion 64 of the support member 60 is flush with the sidewalls of the top member 12. Also, it should be noted that the bottom portion 64 of the support member 60 extends below the coupling loops 40 on sides 16, 22 of the top member 12.

Figure 10:
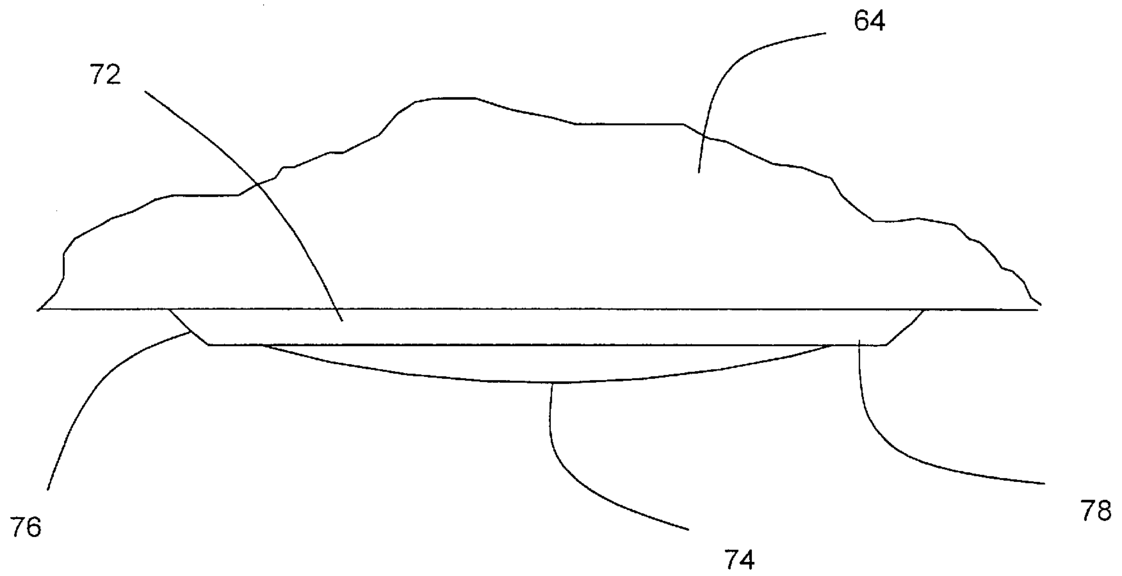
FIG. 10 is a side elevation view of a support node.

A plurality of support nodes 70 are formed on the bottom surface of the support member 60 (see FIG. 3). The support nodes 70 are shown in detail in FIG. 10. Each support node 70 has a tiered configuration that includes a relatively large base portion 72 and a relatively smaller ground-engaging portion 74. The base portion 72 includes a curved outer wall 76 and a flat land 78, which surrounds the ground-engaging portion 74. The ground-engaging portion 74 has a generally spherical form and projects downward from the land 80 on the base portion 72 of the support node 70. In the preferred embodiment of the invention, the ground-engaging portion 74 and the base portion 72 of the support node 70 are concentric when viewed from below.

The support nodes 70 engage the ground when the tiles 10 are installed and elevate the bottom surface of the support member 60 relative to the ground. This elevation of the support member 60 is important because it allows air to circulate between the support nodes 70 beneath the tile 10. The air circulation in turn prevents water-damage to the underlying support surface.

The tiered configuration of the support nodes 10 provides increased support when the tile 10 is subjected to large loads. When relatively light loads are imposed on the tile 10, the ground-engaging nodes 74 compress to absorb the load. When heavier loads are experienced, the ground-engaging portion 74 becomes compressed to such an extent that the base portion 72 of the support nodes 70 engages the ground providing increased support.

The support member 60, as previously mentioned, is separately formed from the top member 12. After the support member 60 is formed, it is bonded to the top member 12 by any suitable adhesive, bonding tape, or mechanical interlocks to form a unitary construction. The adhesive selected should preferably be non-soluble in water.

Figure 11:
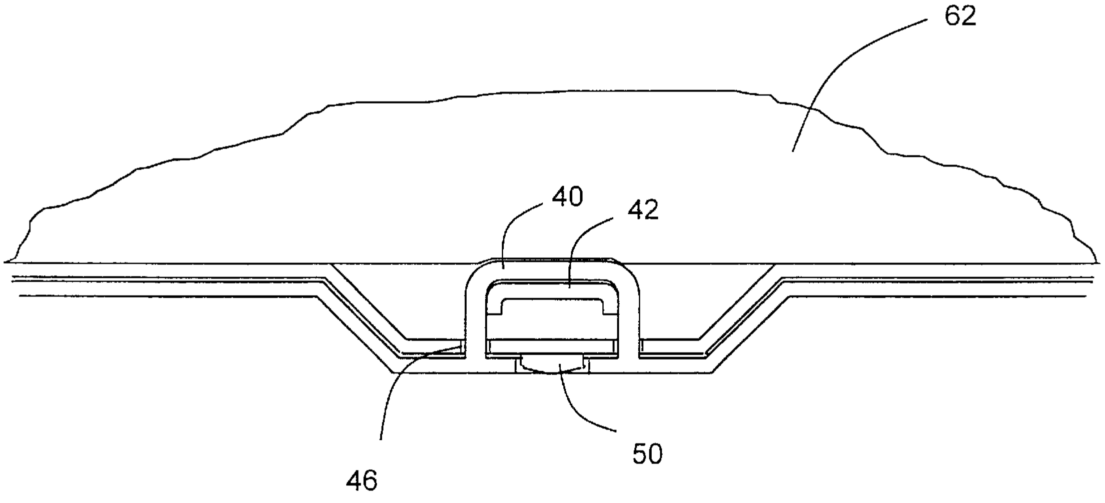
FIG. 11 is a detail view showing the interlocking mechanism used to join two tiles together.

For the purpose of interconnecting the tile 10 with similar tiles, each edge of the tile 10 is provided with an interlocking member. In the disclosed embodiment, the interlocking members consist of a series of coupling loops 40 located along two sides of the tile 10, and a series of posts 42 located along the other two edges of the tile 10. The posts 42 are shown in FIG. 2. The coupling loops 40 are integrally formed with the sidewalls of the tile 10 while the posts 42 are integrally formed and extend downward from the underside of the top surface 14. Adjacent tiles 10 are joined by interlocking the posts 42 from one tile 10 within the coupling loops 40 on an adjacent tile as shown in FIG. 11. It should be noted that when the coupling loop 40 and the posts 42 are interlocked, the top portion 62 of the support member presses against the outer end of the loop 40 to help seat the coupling loop 40 around the post 42.

In the disclosed embodiment, the coupling loops 40 are located in the recesses 34 along sidewalls 16, 22 (see FIGS. 1 and 5). The posts 42 are located adjacent the projections 32 along sides walls 18, 20 (see FIG. 2). It will be readily apparent to those skilled in the art, however, that the loops 46 could be located in the recesses 34 on sidewalls 18, 20 with the posts 42 on the projections 32 along sidewalls 16, 22. Slots 46 are formed in the sidewalls 18, 20 to accommodate the coupling loop 40 which must necessarily pass through the sidewalls 18, 20 to engage the posts 42 (see FIGS. 2 and 6).

Figure 8:
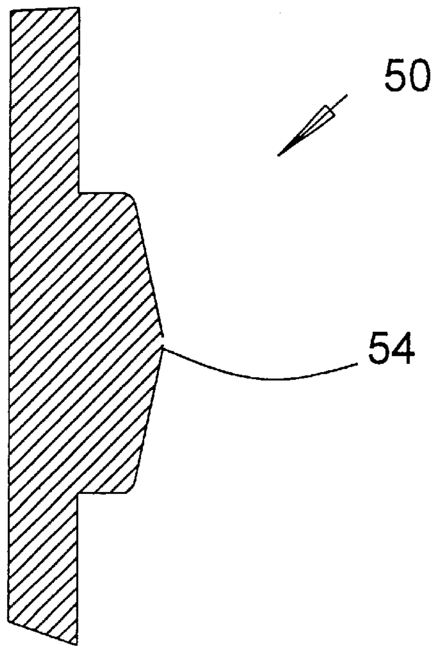
FIG. 8 is a section view of a retainer clip.
Figure 9:
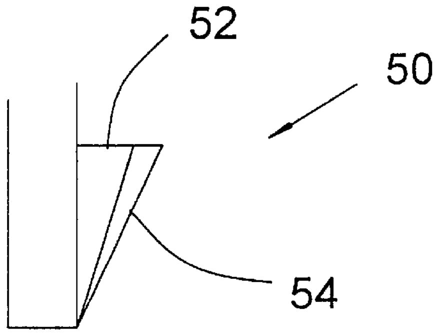
FIG. 9 is a side elevation view of the retainer clip.

A locking mechanism prevents the tiles 10 from lifting after they have been joined. In the disclosed embodiment, the locking mechanism comprises a retainer clip 50 formed on the projections 32 along sidewalls 18, 20 and corresponding notches 56 along sidewalls 16, 22. The retainer clip 50 is shown in more detail in FIGS. 8 and 9. The retainer clip 50 comprises a tab having a flat upper surface 52 and a beveled side surface 54. The flat upper surface 52 is adapted to engage with the notch 56 along sidewalls 16, 22. When the tiles 10 are being joined, the beveled sides 54 of the retainer clip 50 contacts the sidewall of the adjacent tile and flexes inwardly. When the retainer clip aligns with the notch 56 in the adjacent tile 10, the retainer clip 50 returns to its natural locking position. In this position, the top 54 of the retainer clip 50 engages the lower edge of the notch 56 in the adjacent tile to lock the tiles 10 in place.

In use, the floor tiles 10 of the present invention are installed over an underlying support surface. The floor tiles 10 may be installed over an existing floor that is worn or in need of repair. The floor tiles 10 are joined to one another by interlocking the male connectors 50 on one tile 10 with the female connectors 56 on an adjacent tile 10 in the manner previously described. It is not necessary to anchor the floor tiles 10 to the underlying support surface. A floor surface is constructed by simply interlocking the tiles 10.

In the past, molded floor tiles have typically been made in a single solid color, or given a marbled or granite appearance by mixing plastics with different colors and fillers. However, because of the materials and methods traditionally used to manufacture the tiles, more elaborate designs have not been possible.

The present invention overcomes the inherent limitations of prior art tiles and makes it possible to put virtually any design on the surface of the tile 10. By using a two-piece construction to make the floor tiles 10 of the present invention, it is possible to select a suitable material for the top member 12 that can withstand high temperatures and will readily accept sublimation dyes. Images or designs can be superimposed on the top member 12 by a process known as sublimation dye printing. In general, this process entails transferring an image printed on paper onto the surface of the tile 10. The complement of the desired image is printed on a transfer paper using a special class of dyes known as sublimation dyes, which are well-known in the art. Pre-printed transfer paper with sublimation dyes can also be purchased from Holt Manufacturing Company in Burlington, N.C. The transfer paper is then placed face down onto the surface of the tile 10. Heat is applied to sublimate the dye on the transfer paper. When sublimation occurs, the dyes penetrate the pores and polymer matrix of the tile 10 to transfer the image onto the tile 10.

Figure 12A:
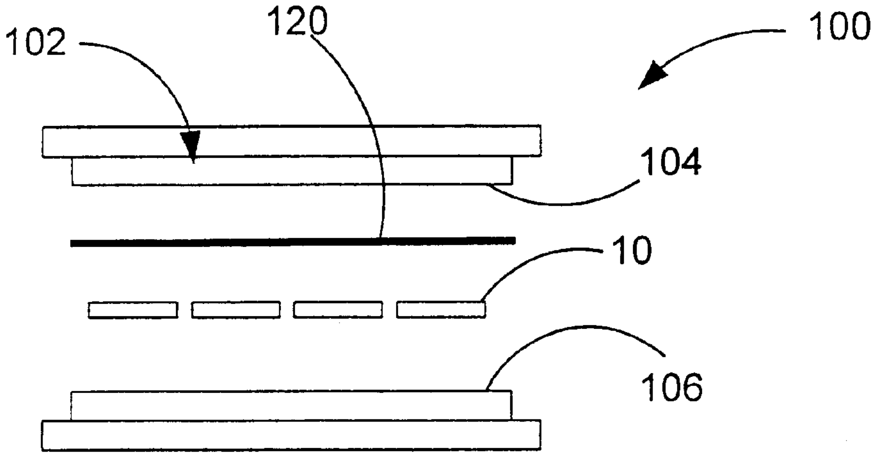
FIGS. 12A and 12B are schematic diagrams of a heating press used to transfer images onto the tile.
Figure 12B:
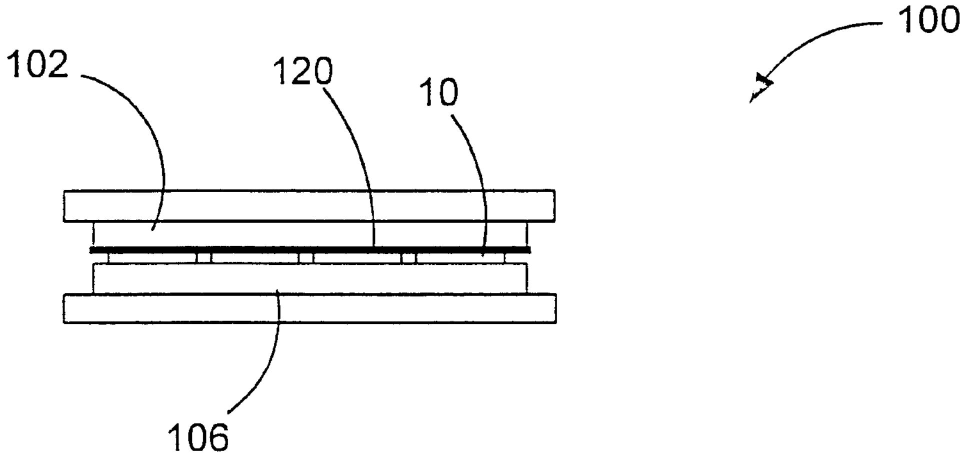
Figure 13:
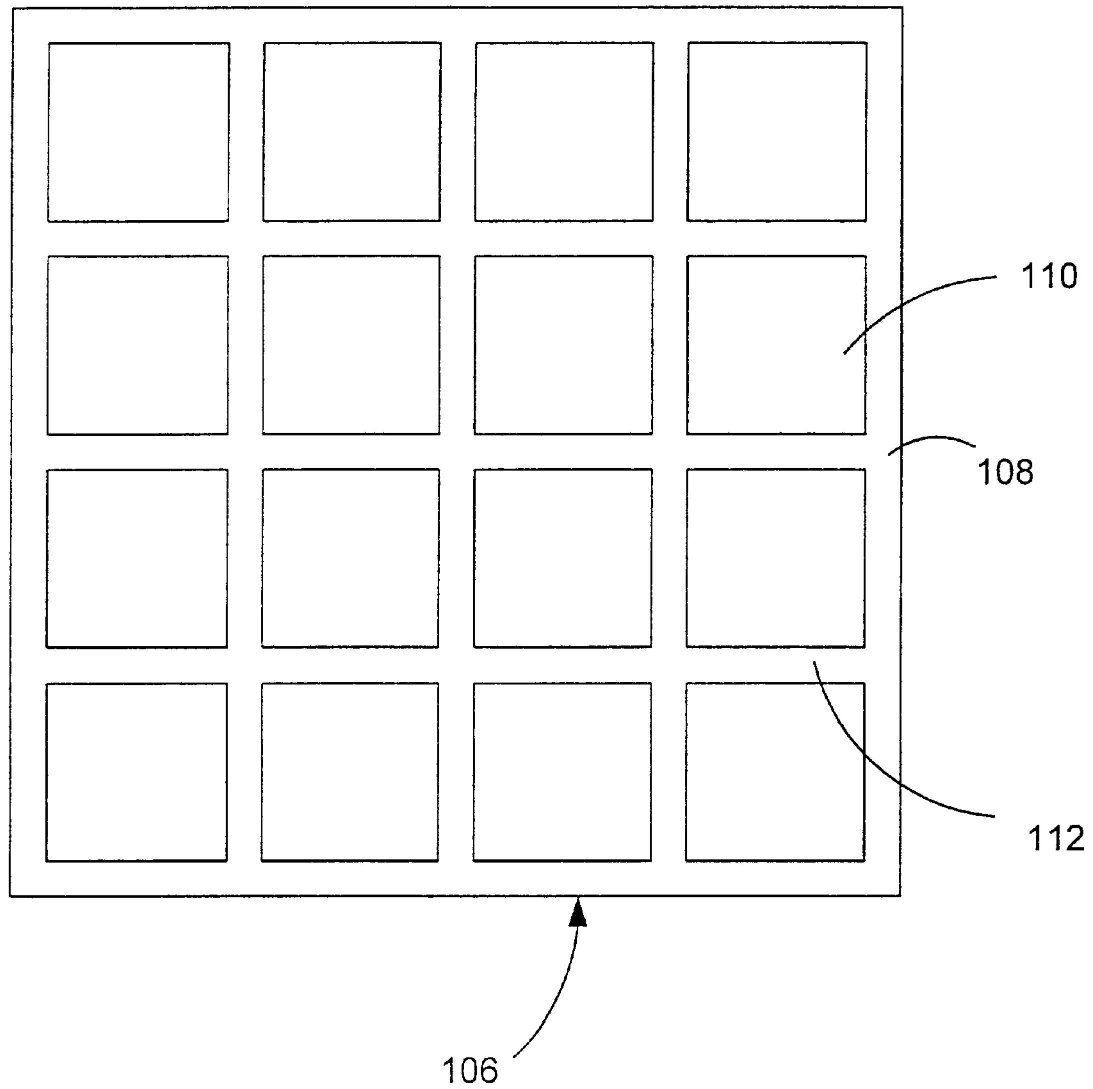
FIG. 13 if a top plan view of the bottom platen of the heating press.
Figure 14:
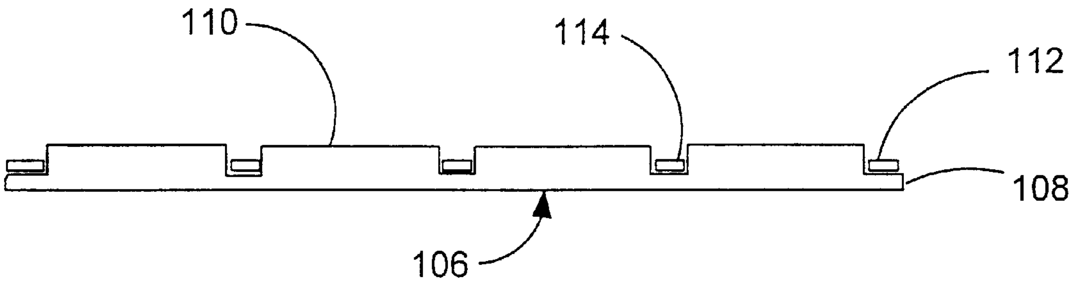
FIG. 14 is a section view of the bottom platen taken through line 14—14 of FIG. 13.

FIG. 12 is a schematic diagram of a heating press 100 used to transfer images onto the floor tiles 10 of the present invention. The heating press 100 has two platens, referred to herein as the top platen 102 and the bottom platen 106. Both platens include heating elements for applying heat to the top members 12 of the tiles 10. It will be appreciated, however, the platens 102, 106 could be reversed and that the orientation of the platens is not material to the present invention.

The top platen 102 comprises a generally flat plate 104 made of metal or other conductive material. The bottom platen 106 comprises a generally flat base plate 108 having a plurality of raised lands 110. The raised lands 110 are arranged in a square array so as to define a series of channels 112 between the lands 110. The channels 112 must be wide enough to allow for expansion and contraction of the tiles during the sublimation process. In a preferred embodiment of the invention, a heat resistant gasket 114 made of silicon rubber, asbestos composite, or other high melt point/low heat conductive material is inserted into the channels 112. The purpose of the heat resistant gasket 114 is to prevent overheating the coupling loops, which tend to bend when excessive heat is applied. It was discovered that when the coupling loops directly contacted the metal surface of the bottom platen 106, the coupling loops tended to deform. The gasket 114 does not reach as high a temperature as the metal surfaces of the platens 102, 106 and therefore prevents deformation of the coupling loops.

In operation, the top members 12 of the tiles 10 are placed face up on the bottom platen 102. A transfer medium with an image thereon to be transferred to the tile 10 is placed face down on the top members 12. Suitable means are provided to ensure proper registration between the top members 12 and the transfer medium. The top platen 102 of the heating press is then lowered to press the transfer medium and top members 12 together. The platens 102, 106 are heated to a temperature sufficient to sublimate the dyes on the transfer paper. This temperature will vary depending on the dyes used but is generally in the range of 330 to 400 degrees Fahrenheit. When sufficiently heated, the dyes sublimate and transfer onto and into the surface of the top members 12. Typically, the dwell time in the heating press is in the range of 15 to 80 seconds. After printing is complete, the tiles are removed from the heating press and placed in a cooling press. The cooling press applies pressure to the tiles to prevent warping or bending while the tiles 10 cool. After the tiles are cooled, they are removed from the cooling press.

It is important that heat be applied on both sides of the tile 10 to prevent the tiles from warping. If the heat is applied, from only one side, the tiles 10 will tend to curl or warp. Applying heat on both sides of the tile 10 minimizes warping and curling. Also, it was discovered that the bottom platen 106 should be slightly hotter than the top platen 102 to effectively transfer the image onto the top surface. When the tile 10 is heated, the top surface of the tile 10 tends to draw away from the top platen so that the resulting image is darker and well defined along the edges of the tile 10 but somewhat lighter and fuzzier in the center of the tile 10. By increasing the temperature of the bottom platen to a temperature greater than the top platen 102, the top surface of tile 10 maintains intimate contact with the top platen 102 so that the resulting image is more uniform. Experiments have shown that a temperature differential between top and bottom said be in the range of approximately 20 to 30 degrees Fahrenheit for a six inch tile made of polypropylene. The temperature differential may vary for different materials and tile geometries.

The operating parameters can be varied during the printing process to obtain many different effects. For example, if a sharp image with well-defined edges is desired, the transfer paper can be pressed into intimate contact with the surface of the tile during the printing process. On the other hand, fuzzy, out-of-focus images and diffuse, pastel-like artwork can be achieved by applying less pressure during the printing process. Intensity of colors can be varied by using different dyes and by varying the dwell time in the heating press.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. A method for making a plastic tile with a superimposed image on a surface thereof, comprising:

a) forming a top member with a generally planar surface and a support member;

b) contacting the planar surface of the top member with a transfer medium impregnated with sublimation dyes;

c) heating the top member and transfer medium to sublimate the dye on the transfer medium;

d) maintaining the transfer medium in contact with the top member while the top member is heated so that the sublimated dyes penetrate the top member to form an image on the planar surface of the top member; and e) joining the top member to the support member after said image is transferred to said top member to form a tile.

2. The method according to claim 1 wherein the top and bottom surfaces of the top member are heated to minimize warping of the top member.

3. The method according to claim 2 wherein the heat applied to the bottom of the top member is greater then the heat applied to the top of the top member.

4. The method according to claim 1 further including cooling the top member after the dye penetrates the top member to entrap dye particles in the top member.

5. The method according to claim 3 further including the step of pressing the top member flat while it is cooled to minimize warping.

6. The method according to claim 1 wherein the image is a repeating pattern.

* * * * *